(12) United States Patent
Cross et al.

(10) Patent No.: US 7,019,734 B2
(45) Date of Patent: Mar. 28, 2006

(54) RESISTIVE TOUCH SENSOR HAVING MICROSTRUCTURED CONDUCTIVE LAYER

(75) Inventors: Elisa M. Cross, Woodbury, MN (US); Robert S. Moshrefzadeh, Oakdale, MN (US); Leland R. Whitney, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 474 days.

(21) Appl. No.: 10/196,794

(22) Filed: Jul. 17, 2002

(65) Prior Publication Data

US 2004/0012570 A1    Jan. 22, 2004

(51) Int. Cl.
*G09G 5/00* (2006.01)
*G08C 21/00* (2006.01)

(52) U.S. Cl. ............... 345/173; 345/174; 345/176; 178/18.01; 178/18.03; 178/18.05; 178/18.06; 178/18.07

(58) Field of Classification Search ........ 345/173–180; 178/18.01–18.09, 19.01–19.07
See application file for complete search history.

(56) References Cited

U.S. PATENT DOCUMENTS

| | | | |
|---|---|---|---|
| 6,356,259 B1 | 3/2002 | Maeda et al. | |
| 6,572,941 B1 | 6/2003 | Murakami et al. | |
| 6,738,051 B1 * | 5/2004 | Boyd et al. | 345/176 |
| 6,847,355 B1 * | 1/2005 | Nishikawa et al. | 345/173 |

FOREIGN PATENT DOCUMENTS

| | | |
|---|---|---|
| EP | 1011040 | 6/2000 |
| JP | 8-286812 | 11/1996 |
| JP | 2001-228975 | 8/2001 |
| JP | 2002-196887 | 7/2002 |
| WO | WO 0079475 | 12/2000 |

* cited by examiner

*Primary Examiner*—Vijay Shankar
(74) *Attorney, Agent, or Firm*—Robert J. Pechman

(57) ABSTRACT

The present invention discloses resistive touch sensors that incorporate microstructured conductive layers. When local electrical contact is made between the microstructured conductive layer and an opposing conductive layer due to a touch input, the resulting signal can be used to determine the location of the touch. The microstructures can be used to penetrate a solid, deformable filler material disposed between the conductive layers, for example to provide more transmission of light through the sensor. The microstructures can also provide additional functionalities such as z-axis sensitivity, image direction, light control, light extraction, and so forth.

40 Claims, 3 Drawing Sheets

RESISTIVE TOUCH SENSOR HAVING MICROSTRUCTURED CONDUCTIVE LAYER

The present invention relates to touch panel user interface devices and to resistive touch sensors.

BACKGROUND

A touch screen offers a simple, intuitive interface for a computer or other data processing device. Rather than using a keyboard for data entry, a user can transfer information through a touch screen by touching an icon or by writing or drawing on a screen. Touch screens are used in a variety of information processing applications. Transparent touch screens, used over an information display such as a liquid crystal display (LCD) or cathode ray tube (CRT), are particularly useful for applications such as cell phones, personal data assistants (PDAs), handheld or laptop computers, point of sale or public kiosks, and other applications.

SUMMARY OF THE INVENTION

In one embodiment, the present invention provides a touch sensor for determining a location of a touch input that includes a conductive layer, a plurality of conductive microstructures facing the conductive layer, and a solid, deformable filler material disposed between the conductive layer and the conductive microstructures. The location of the touch is determined using an electrical signal produced by local electrical contact between the conductive layer and a portion of the conductive microstructures due to the touch input.

In another embodiment, the present invention provides a resistive touch sensor that includes a first plurality of conductive microstructures disposed on a flexible substrate and a second plurality of conductive microstructures spaced apart from and facing the first plurality of conductive microstructures. The location of the touch input is determined using an electrical signal produced by local electrical contact between a portion of the first plurality of conductive microstructures and a portion of the second plurality of conductive microstructures, the local electrical contact due to the touch input.

In still another embodiment, the present invention provides a touch sensor that includes a first substrate having a first conductive layer, a second substrate comprising a second conductive layer conformally covering a plurality of microstructures, and a solid, deformable filler material disposed between the first and second conductive layers. At least one of the first and second substrates is flexible to allow electrical contact between the first conductive layer and the second conductive layer upon application of a force from a touch input so that the touch input location can be determined.

In yet another embodiment, the present invention provides a method for determining the location of a touch input on a resistive touch sensor. The method includes contacting a first electrode layer and a second electrode layer in response to the touch, the first electrode layer including a plurality of microstructures, a portion of the microstructures penetrating through a solid, deformable filler material during the contacting step. Further the method includes measuring a signal due to contacting the first electrode layer and second electrode layer.

In another embodiment, the present invention provides a method of making a touch screen by conformally coating a first conductive layer over a plurality of microstructures on a first substrate, disposing a second substrate that includes a second conductive layer so that the first and second conductive layers can make electrical contact in response to a touch input on the touch screen, the first and second conductive layers being electrically isolated in the absence of a touch input condition, and disposing a solid, deformable filler material between the first and second conductive layers.

In another embodiment, the present invention provides a touch sensor that includes a first conductive layer spaced apart from a second conductive layer, the second conductive layer disposed over a plurality of microstructures, the plurality of microstructures disposed to alter the direction of light transmitted through the touch sensor.

In still another embodiment, the present invention provides a touch sensor that includes a first conductive layer spaced apart from a second conductive layer, the second conductive layer disposed over a plurality of microstructures, the plurality of microstructures including a plurality of visible light absorptive rib structures disposed so that there exists a viewing angle at and beyond which the light absorptive rib structures block substantially block viewing of a display object through the touch sensor.

In yet another embodiment, the present invention provides a touch sensor that includes a flexible substrate having a touch surface oriented toward a viewer position, a plurality of microstructures oriented away from the viewer position, and a first conductive layer covering the microstructures. The touch sensor further includes a rigid substrate having a second conductive layer spaced apart from and facing the first conductive layer. The touch sensor further includes one or more light sources optically coupled to the flexible substrate so that light can be injected into the flexible substrate and extracted by the microstructures away from the viewer position.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
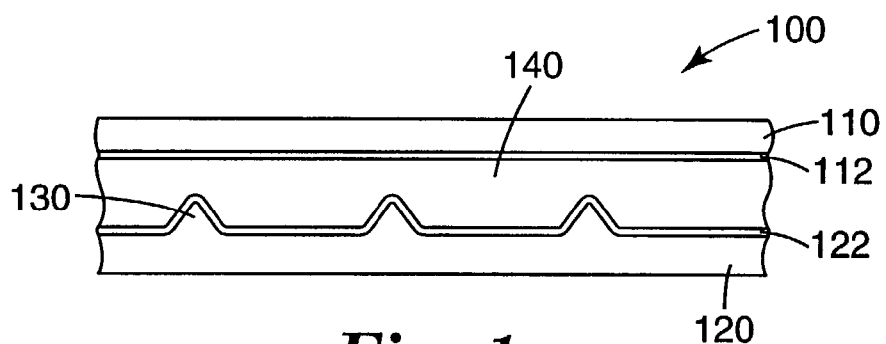
FIG. 1 is a schematic side view of a portion of a resistive touch sensor according to the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

Resistive touch sensors typically include two transparent conductive layers separated by an air gap. At least one of the conductive layers is disposed on a flexible substrate so that application of a touch input brings the conductive layers into local electrical contact. Upon contact, a signal can be measured that can be used to locate the position of the touch input. Resistive touch sensors can suffer certain performance deficiencies such as reduced brightness and contrast of a display viewed through the touch sensor due in part to the existence of the air gap between the conductive layers, as well as less than desirable durability due in part to the repeated flexing and contact of the conductive layers, which are typically composed of a brittle transparent conductive oxide.

It may be possible to enhance the optics of resistive touch screens by filling the gap between the conductive layers with an insulating liquid material so that reflections may be reduced. However, the introduction of a liquid material in the gap requires exceptional sealing around the perimeter of the sensor to prevent the liquid filler from leaking, and that such sealing survives over the desired lifetime of the sensor. It is also not clear whether or to what degree the addition of a liquid filler would provide durability benefits.

There exists a need for a resistive touch sensor that provides the benefits of enhanced optics and durability without the drawbacks that accompany the use of a liquid filler material. The present invention provides a resistive touch sensor that includes first and second conductive surfaces and a deformable, resilient solid material disposed between them. The present invention further provides that at least one of the conductive surfaces is microstructured, and the microstructures are provided to penetrate the deformable, resilient solid filler material upon application of a sufficient touch force to allow electrical contact between the first and second conductive surfaces. By providing microstructures that concentrate the applied touch force over a relatively small area, the solid filler material can be penetrated to allow electrical contact between the conductive layers. In addition, upon release of the touch input force, the conductive surfaces can return to their rest positions urged by the resilient filler, and the volume of the solid, deformable filler material that was penetrated by the microstructures can heal. Without the presence of the microstructures, a relatively large volume of the filler material would need to be pushed out of the way in order for electrical contact to be made between the conductive surfaces, very likely causing large and permanent defects in the filler layer, which defects might undermine the benefits gained by inclusion of the filler or otherwise cause undesirable characteristics to emerge with use of the device.

As stated, resistive touch sensors include two opposing conductive layers spaced apart, at least one of the conductive layers being flexible to allow the conductive layers come into local electrical contact upon application of a touch force from a touch input to the device, the conductive layers returning to a separated state upon release of the touch force. Signals can be measured due to the electrical contact and used to determine the location of the touch input. In the present invention, at least one of the conductive layers includes a plurality of microstructured features that protrude toward the other conductive layer. The structured conductive layer can be formed by conformally covering a plurality of microstructures with a suitable conductive material. Conformal covering results when the layer covering the microstructures is thin enough to preserve some aspect of the underlying structure so that areas that protrude in the underlying structure still protrude upon adding the conductive layer.

Microstructures are intended features on a surface that are adhered to or integrally formed with that surface and have characteristic dimensions that are typically measured in microns or fractions of microns, for example having heights that are on the order of or less than 1000 microns (1 mm). Microstructures can form ordered arrays, or can be disordered and/or randomly or stochastically placed. For the purposes of the present invention, exemplary microstructures include those capable of penetrating a solid, deformable and resilient filler material disposed between the microstructures and a conductive surface in a resistive touch sensor. Exemplary microstructures also include those having features that provide additional functionalities, such as described in more detail in discussions that follow.

Resistive touch sensors that include microstructures can provide a number of benefits. The microstructures can allow touch sensor constructions in which the gap between the conductors is filled with a suitable material, the microstructures providing protrusions that can penetrate through the filler material to make electrical contact with the opposing conductive layer. This can allow the use of a wide variety of filler materials, especially solid, deformable filler materials that do no require special sealing around the device and that can optionally be adhered to either or both of the conductive layers. The presence of the filler material can provide for higher transmission of light through the touch sensor as well as reduced reflection due to the filling of the air gap that is typically present in resistive touch sensors, therefore increasing contrast, brightness, and resolution. Such benefits can be achieved chiefly by selecting a highly transmissive filler material that has a refractive index sufficiently close in magnitude to the refractive indices of adjacent layers in the construction so that reflections are reduced. The presence of the filler material can provide a number of other benefits such as eliminating the need for spacers, protecting the conductive layers from adverse environmental effects, protecting the conductive layers from excessive cracking or flaking, reducing warping defects in the device (especially if the filler material is adhered to one or more of the conductive layers), and the like.

In addition, the microstructures can provide well-defined areas of contact for consistent and predictable touch signals. The heights of the microstructures (e.g., the distances that the microstructures protrude) are controllable so that electrical shorts between the opposing conductive layers are unlikely and can be prevented, even without the use of spacer dots. The may be contrasted with devices that employ conductive particles or protrusions that necessarily have a certain size distribution, thereby risking the inclusion of particles or protrusions that might bridge the gap between conductors. Further, because the sizes and shapes of microstructures are controllable, properties such as activation force (the touch force required to activate the device), contact resistance, positional accuracy and resolution, optical properties and effects, and the like can be made uniform or desirably varied across the device. For example, the spacing between microstructured contacts can be varied across the device to vary the response of the sensor at different positions, the heights of the microstructures can be controlled to give a uniform activation force (or that is desirably non-uniform), and/or to allow some ability to sense the magnitude of the touch force, and so on. Resistive touch sensors of the present invention can also be made highly durable. These and other potential benefits and features are further described in the discussion that follows.

FIG. 1 shows a touch sensor 100 that includes a first substrate 110, a first conductive layer 112 disposed on substrate 110, a second substrate 120 that includes a plurality of microstructures 130, and a second conductive layer 122 conformally disposed over the microstructures 130 and substrate 120, with the first conductive layer 112 and second conductive layer 122 separated by a gap 140. At least one of the substrate/conductive layer combinations is flexible to allow deformation in response to an applied touch force so that contact can be made between the first and second conductive layers within an area that corresponds to the characteristics of the touch input (location, size of touch implement, force of touch, etc.). Upon making electrical contact between the conductive layers, a signal can be measured that can be used to locate the position of the touch input, as is well known in the art. The other substrate/conductive layer combination can be rigid or flexible. If both substrates are flexible, it is preferred that the touch sensor be mounted onto a rigid support, for example onto the front glass plate of an electronic display screen.

Microstructured conductive layers can be used in any suitable resistive touch sensor technology, including 4-wire, 5-wire, and other resistive sensors. In some resistive sensors, one of the conductive surfaces is driven with an electrical field which is preferably linearized while the other conductive surface is used as an electrical sink. When microstructured conductive layers are used in such a resistive sensor, the microstructured layer is preferably the sink layer so that non-uniformities in the electric field induced by the presence of the microstructures are not an issue for the functionality of the sensor.

The substrates can be made of any suitable material, and are generally highly electrically insulating as compared to the conductive layers. Glass, ceramic materials, flexible plastic sheets or films, rigid plastics, and other such materials can be used. In many applications, the touch sensor is provided as an overlay for an electronic display, and so it may be desirable for the substrates to be substantially transmissive of visible light. In other applications, graphics, text, or other indicia are provided between the user and the touch sensor, and in these applications transparent substrate materials might not be required.

Conductive layers 112 and 122 can be composed of any suitable material or materials combinations that can be provided in a desirable manner and at a desirable thickness and still provide desirable electronic properties. The resistivity of the conductive layers should be high enough to allow the position of the touch to be determined from the measured signals resulting from the touch. As such, conductive layers in resistive touch sensors are often referred to as resistive layers, and may be referred to as such in this document. Exemplary conductive layer materials include metals, semi-metals, doped semiconductors, conductive metal oxides, organometallic materials, conductive polymers, and the like. In applications where it is desirable to allow viewing of a display or other object through the touch sensor, the conductive layers should be sufficiently transmissive of visible light. Sufficient transmission of visible light can be achieved with various transparent conductive oxides such as tin oxide, indium tin oxide (ITO), antimony tin oxide (ATO), and others, as well as many conductive polymers such as polypyrrole, polyaniline, polyacetylene, polythiophene, polyphenylene vinylene, polyphenylene sulfide, poly p-phenylene, polyheterocycle vinylene, and materials disclosed in European Patent Publication EP-1-172-831-A2.

The conductive layers can be continuous over the active area of the touch sensor or can be patterned. For example, the conductive layer 122 disposed on the microstructures can be continuous over all the microstructures or patterned to reside on separate microstructures, or sets of microstructures, with gaps in between. Conductive layer 112 can also be continuous or patterned. Applications of patterned conductive layers are discussed in more detail in connection with FIG. 3. Conductive layer 122 is conformally disposed over microstructures 130. Conductive layer 122 can be suitably conformally disposed using techniques such as sputter coating, vapor deposition, plating, coating from solution, and the like. The particular deposition technique used will generally depend on the conductive material(s) being deposited, and may also depend on the size and shape of the microstructures and desired thickness of the conductive coating. Conformal disposition of conductive layer 122 results in protrusions that correspond to the positions of the microstructured protrusions, although the shape and size of the protrusions after disposition of the conductive layer may differ from that of the original microstructures.

Figure 2A:
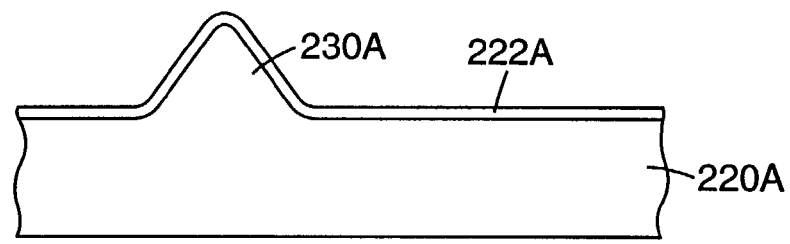
FIGS. 2A through 2C are schematic side views of a portion of a microstructured substrate and conductive layer useful in the present invention.

Microstructures 130 can include any suitable structures, including but not limited to those shown and described in this document. Microstructures 130 can be integral to substrate 120 or can be separately formed, adhered, or otherwise provided on substrate 120. For example, FIGS. 2(a), 2(b), and 2(c) indicate various scenarios. FIG. 2(a) shows a substrate 220A having an integral microstructure 230A. Microstructure 230A may be provided by micro-molding, embossing, extrusion, casting and curing, or otherwise forming substrate 220A, or by subtractive techniques such as etching substrate 220A. Conformal conductive layer 222A is also shown.

Figure 2B:
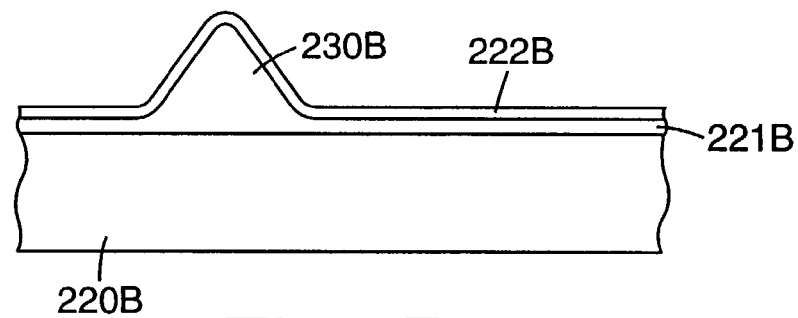

FIG. 2(b) shows substrate 220B having a microstructured layer 221B provided thereon. Microstructured layer 221B includes microstructure 230B, and conformal conductive layer 222B is disposed thereon. Microstructured layer 221B can be formed by micro-molding techniques such as casting and curing, or can be formed by embossing, etching, or other suitable techniques. Microstructured layer 221B can be formed directly on substrate 220B or can be separately formed and later adhered or otherwise disposed on substrate 220B. The areas of layer 221B located between adjacent microstructures is sometimes referred to as the "land."

Figure 2C:
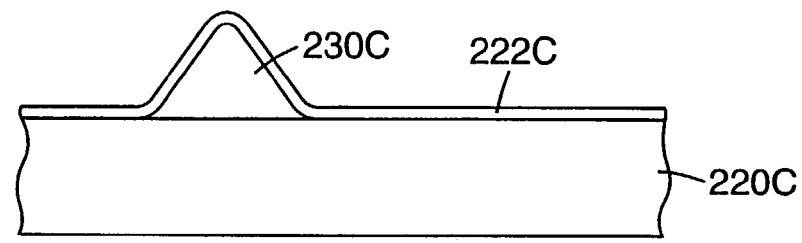

FIG. 2(c) shows substrate 220C that includes a microstructure 230C. Microstructure 230C is not integral with substrate 220C (as in FIG. 2(a)), nor is microstructure 230C part of a microstructured layer (as in FIG. 2(b)). Microstructure 230C can be provided by ink jet printing, screen printing, lithography techniques (such as photolithography), etching, or other suitable techniques. Conformal conductive layer 222C is disposed over microstructure 230C and substrate 220C.

Referring back to FIG. 1, conductive layers 112 and 122 are separated by gap 140 under conditions where no sufficient touch force is being applied. The conductive layers are thus electrically isolated until a sufficient touch force is applied, and are electrically isolated upon removal of the sufficient touch force. The gap can be air or another gas, a liquid, or a deformable and resilient material. The gap can be maintained by securing the flexible substrate to one or more gap spacers (not shown) generally located outside of the active touch area of the sensor, for example, around the periphery of the device. Alternatively or in addition, the gap can be maintained by the use of spacer dots (not shown) located within the active area of the sensor and/or by the gap filler material itself, particularly when the gap filler is a deformable solid material. Spacer dots can be used to help prevent spurious contacts between the conductive layers in the absence of touch forces, and/or to adjust the activation force for the sensor, and/or to help limit the areas of contact between the conductive layers, for example to limit the areas of contact to the microstructural contact points.

The present invention allows the use of solid, deformable and resilient filler materials in resistive touch sensors. A microstructured conductive layer can be provided so that the microstructures are able to penetrate the deformable filler material upon application of a sufficient touch force so that reproducible and predictable electrical contacts can be made between the conductive layers of the device when activated. In contrast, it may be difficult, if possible, to make contact between two essentially planar conductive layers through a solid, deformable filler material, much less consistent and reproducible contact that is not destructive to the filler layer (e.g., that does not result in permanent local deformations and/or holes in the filler).

Exemplary solid, deformable fillers include materials that can maintain sufficient electrical separation between the conductive layers and that exhibit deformability and resiliency properties that allow compression and/or penetration of the filler to allow electrical contact between the conductive layers via one or more microstructures upon application of sufficient touch force. Exemplary fillers include silicones, polysiloxanes, polyurethanes, polysilicone-polyurethanes, rubber, ethylene-vinyl acetate copolymers, phenolic nitrile rubber, styrene butadiene rubber, polyether-block-amides, and polyolefins, as well as various gels and other like materials. For example, gel materials such as those disclosed in U.S. Pat. No. 5,686,705 can be used, particularly in applications where the device is not transparent. Clear deformable filler materials (for example clear silicone materials) may be particularly suited to applications where a display or other object is meant to be viewable through the device. The filler material can additionally include insulating or conductive particles for spacing, optical diffusion, aid in making electrical contact, and so forth.

Filling the gap between the conductive layers can provide several benefits. Filling the gap can eliminate the air gap between the conductive layers that increases reflection and reduces transmission of light, thus being beneficial in applications where it is desirable for the device to be transmissive of visible light due to a resulting increase in contrast, brightness, and resolution. Matching or nearly matching the refractive index of the filler material to the refractive indices of the adjacent layers can further reduce reflections and increase transmission. Filling the gap can also provide protection to the conductive layers, especially for conductive layers that might otherwise be prone to flaking due to repeated contact and flexure such as ITO and other transparent conductive oxides. The filler can also help protect conductive layers from environmental elements to which they are susceptible, for example air or moisture. Thus, aside from optical benefits, the filler can improve durability to the conductive layers, extending their functional lifetime beyond the lifetime of comparable conductive layers in conventional resistive touch sensors.

A resilient, deformable solid gap filler can provide a certain amount of protection to the microstructures. As the deformable gap filler material is compressed during a touch input, compression becomes more and more difficult with additional force, thereby protecting microstructures that might otherwise be damaged under high stress. Upon initial application of a touch force, the forces are concentrated around the tips of the microstructures. A relatively small volume of filler material can be pushed out of the way and penetrated by the microstructure tips under the area where the touch force is applied so that the microstructures can make contact with the opposing conductive layer. As additional force is applied, more pressure is dissipated through the filler material. Ultimately, the solid, deformable filler material becomes difficult to compress any further. This can put a limit on the amount of force that the tips of the microstructures, already in contact with the other conductive layer, must bear, thereby protecting the microstructures as well as the conductive layer material in those areas. This can also limit the amount of filler material that must be pushed out of the way to allow a measurable contact for determination of touch location. When the touch input force is released, the microstructures recede from their contact position, and the deformable material pushed out of the way can now re-fill the void, thus healing the temporary "holes."

Figure 3:
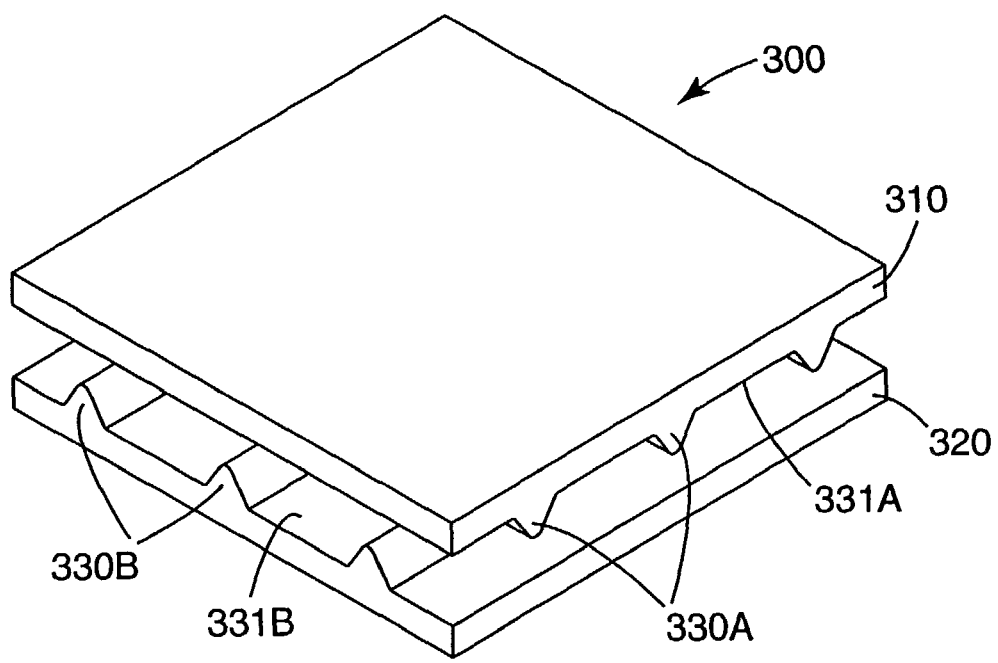
FIG. 3 is a schematic view of a portion of a resistive touch sensor according to the present invention.

In addition to having microstructures on one side of the device construction (as seen in FIG. 1), microstructures can be present on both sides of the device construction. When microstructures are present on both sides, the microstructured features can be the same or different, they can be aligned or staggered, they can have a particular relative orientation, and so forth, depending on the application. By way of example, FIG. 3 shows a resistive touch sensor 300 that includes a first substrate 310 having a first series of parallel ridge microstructures 330A and a second substrate 320 having a second series of parallel ridge microstructures 330B oriented orthogonally to microstructures 330A. The ridges could also be oriented in the same direction and positioned peak to peak or peak to valley, the latter being indicated for illustrative purposes in FIG. 4. All suitable configurations having microstructures on each side of the construction will be appreciated by the skilled artisan and are contemplated in the present invention.

Referring again to FIG. 3, another embodiment of the present invention can be described. As discussed, the conductive layers can be continuous or patterned. For example, in FIG. 3, the conductive layers can be patterned so that they reside only on the microstructures 330A and 330B, and not on areas between microstructures, such as areas 331A and 331B. Such a construction might be used as a touch position digitizer, with each conductive "stripe" associated with a microstructured ridge being individually addressable. A touch input would result in a pair of facing conductive stripes coming into electrical contact, thereby pinpointing the location of the touch. If more than one adjacent pair come into simultaneous contact, interpolation can be performed to located the touch position. A similar sensor can be made having a patterned conductive layer on a microstructured substrate and an opposing orthogonally patterned conductive layer on a flat substrate. Other combinations are appreciated and can be employed, including various combinations of patterned and continuous conductive layers on flat and microstructured substrates, the microstructures including ridges, posts, or any other suitable structures.

Figure 4:
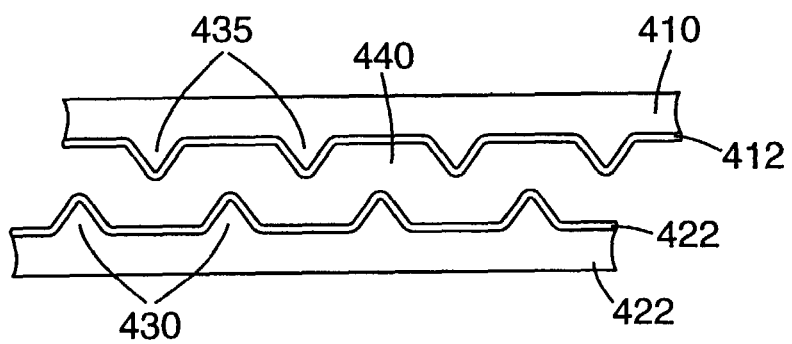
FIG. 4 is a schematic side view of a portion of a resistive touch sensor according to the present invention.

FIG. 4 shows another resistive sensor 400 that includes a first substrate 410 having a plurality of microstructures 435 and a conformal conductive coating 412, a second substrate 420 having another plurality of microstructures 430 and another conformal conductive coating 422, the conductive coatings separated by a gap 440 that can include a gap filler, and the microstructures being staggered to fit in the valleys of the facing microstructures. As discussed above, other combinations are also possible and contemplated in the present invention, FIG. 4 being shown merely for illustration.

Figure 5:
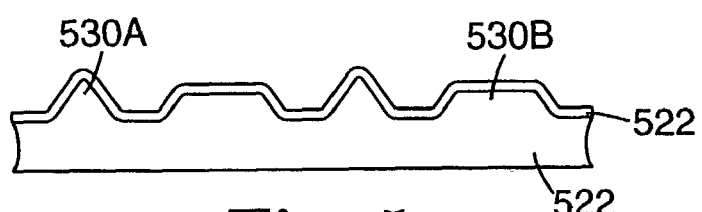
FIG. 5 is a schematic side view of a portion of a microstructured substrate and conductive layer useful in the present invention.

The microstructures can be used to provide additional sensitivity related to the force of the touch input, termed z-axis information. For example, in some embodiments, it may be desirable to have two or more distinct types of microstructural features for additional functionality. FIG. 5 shows a substrate 520 that includes a plurality of taller microstructures 530A each having a relatively small contact area and a plurality of shorter microstructures 530B each having a relatively large contact area. The microstructures are provided with a conformal conductive coating 522. Such a configuration could be used in touch sensors of the present invention so that relatively low force touch inputs give rise to electrical contact only with contact points on the taller microstructures 530A. With sufficient additional force, additional electrical contacts can be made with the shorter microstructures 530B. Because the contact areas for the taller and shorter microstructures are significantly different, the signals obtained for a low force touch and a high force touch can be distinguished. Thus, in addition to reporting the location of the touch input, the system can provide different responses as a function of the applied force. For example, a high force touch might correspond to a double-click operation whereas a lighter force touch might correspond to a single-click operation.

Figure 6:
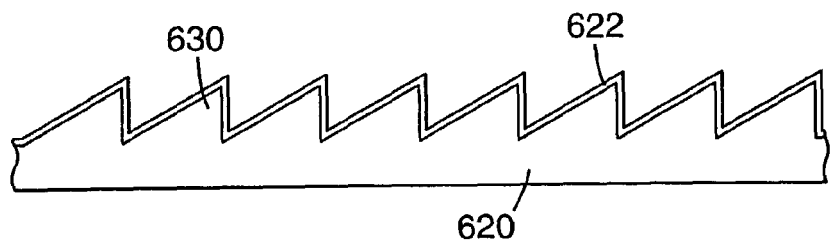
FIG. 6 is a schematic side view of a portion of a microstructured substrate and conductive layer useful in the present invention.

The microstructures provided in resistive touch sensors of the present invention can optionally provide additional functionalities not found in known touch sensors. For example, in applications where the touch sensor is disposed over a display that is viewable through the touch sensor, the microstructures can be used to redirect light from the display, increase or decrease the viewing angle of the display, and so forth. FIG. 6 shows a substrate 620 having a saw-tooth pattern of microstructures 630 that may be useful in redirecting light originating from below the sensor. In many applications where the microstructures are used to manage light directed through the touch sensor, it may be necessary to have a sufficiently large refractive index difference between the material of the microstructures and the medium residing between conductive layer 622 and the opposing conductive layer. Therefore, in some cases it may be desirable to maintain an air gap between the conductive layers, although a desired amount of light management can be achieved using a gap filler.

One light management application is where the microstructures act as an image directing film. An image directing film can extend the functionality of a display by allowing mounting at a variety of viewer angles without changing the fundamental structure of the display. For example, a casino may use the same display mounted vertically, in a desktop orientation or at some intermediate viewing angle with respect to the gambler by simply selecting a multifunctional touch screen with appropriately integrated image directing properties.

Figure 7:
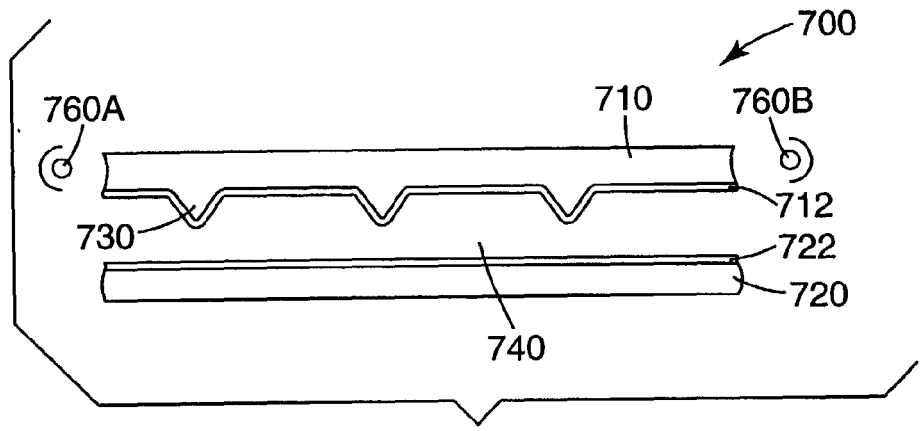
FIG. 7 is a schematic side view of a portion of a resistive touch sensor that incorporates features useful as a front light guide.

FIG. 7 shows yet another functionality for the microstructures. In FIG. 7, touch sensor 700 includes a first substrate 710 having microstructures 730 and a conformal conductive layer 712, and a second substrate 720 having a second conducive layer 722, the conductive layers 712 and 722 separated by a gap 740 containing a sufficiently low refractive index medium such as air. One or more light sources, for example 760A and 760B, can be coupled to substrate 710 so that light can be injected into substrate 710 and propagate therethrough via internal reflection. Light propagating through substrate 710 that encounters a microstructure 730 can be extracted downward through the touch sensor 700 toward a reflective liquid crystal display (not shown), for example, positioned below the touch sensor 700. In this way, touch sensor 700 can serve as a front light source and front light guide.

Figure 8:
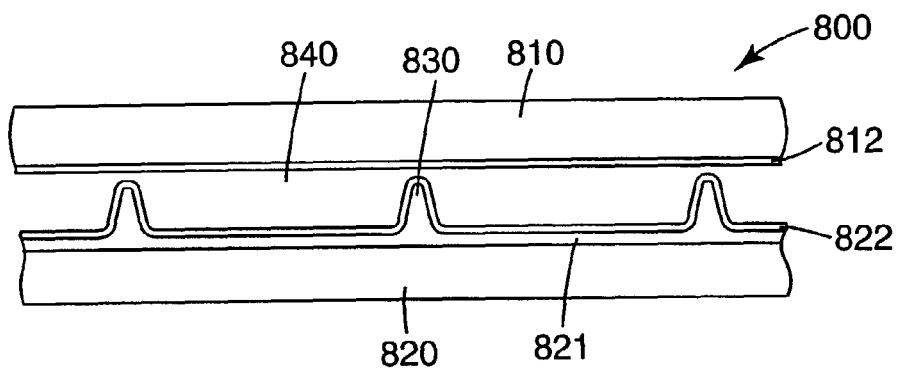
FIG. 8 is a schematic side view of a portion of a resistive touch sensor that incorporates features useful as a light control film.

FIG. 8 shows a touch sensor 800 that includes a first substrate 810 having a first conductive layer 812, and a second substrate 820 having a microstructured layer 821 that includes microstructures 830 and a second conductive layer 822 conforming to the microstructures, the conductive layers 812 and 822 separated by gap 840. Microstructured layer 821 includes a light absorptive material, such as carbon black, so that light can be sufficiently transmitted through the "land" areas of the microstructured layer, but light entering the microstructures 830 is substantially blocked. Thus, when viewing an object through sensor 800 at increasingly higher angles, less of the object will be viewable because more of the light will be blocked by the microstructures. When used as an overlay sensor for a display, touch sensor 800 can serve as a touch panel and as a privacy filter.

Figure 9:
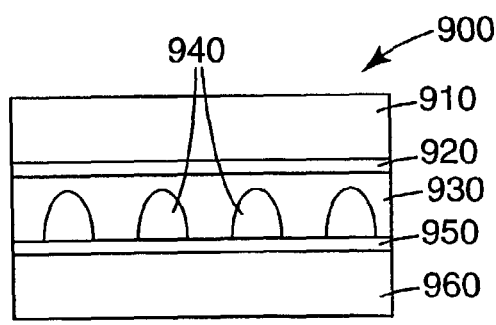
FIG. 9 is a schematic side view of a portion of a resistive touch sensor that incorporates microstructures according to the present invention.

FIG. 9 shows a schematic side view of a touch sensor 900 in accordance with another embodiment of the present invention. Touch sensor 900 includes optically transparent substrates 910 and 960, optically transparent conductive films 920 and 950, and a solid deformable material 930 disposed between the optically transparent conductive films 920 and 950. Touch sensor 900 further includes a plurality of conductive microstructures 940 disposed on conductive film 950 and facing conductive film 920. According to this particular aspect of the invention, a location of an applied touch is determined when the applied touch locally deforms the filler material 930 such that a portion of conductive microstructures 940 resistively couples to the conductive film 920 at or near the touch location. An advantage of this particular embodiment of the invention can be that by forming the conductive film 950 over a smooth substrate 960, a more uniform sheet resistance may be achieved. In general, conductive microstructures 940, and conductive films 920 and 950 can include different materials. In some applications, however, conductive films 920 and 950 can be made of the same material that may be different than the material composition of conductive microstructures 940. In yet other applications, conductive microstructures 940, and conductive films 920 and 950 can be made of substantially the same material.

Exemplary methods for forming conductive microstructures 940 include inkjet printing, screen printing, stencil printing, lithography including photolithography, and cast and cure. Other suitable methods can be used to form conductive microstructures 940. Conductive microstructures 940 can be optically transparent, opaque, or translucent. FIG. 9 shows truncated ellipsoidal conductive microstructures 940. In general, conductive microstructures 940 can have any other shape. In addition, microstructures 940 can have a shape in a touch area that is different than a shape in another touch area, for example, to achieve a desired touch activation force.

The present invention should not be considered limited to any particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the instant specification.

Each of the patents, patent documents, and publications cited above is hereby incorporated into this document as if reproduced in full.

What is claimed is:

1. A touch sensor for determining the location of a touch input comprising:
   a first plurality of conductive microstructures disposed on a flexible substrate; and
   a second plurality of conductive microstructures spaced apart from and facing the first plurality of conductive microstructures,
   wherein the location of the touch input is determined using an electrical signal produced by local electrical contact between a portion of the first plurality of conductive microstructures and a portion of the second plurality of conductive microstructures, the local electrical contact due to the touch input.

2. The touch sensor of claim 1, further comprising a filler material disposed between the first and second plurality of conductive microstructures.

3. The touch sensor of claim 2, wherein the filler material is solid and deformable.

4. A touch sensor for determining a location of a touch input comprising:
   a conductive layer;
   a plurality of conductive microstructures facing the conductive layer; and
   a solid, deformable filler material disposed between the conductive layer and the conductive microstructures,
   wherein the location of the touch input is determined using an electrical signal produced by local electrical contact between the conductive layer and a portion of the conductive microstructures due to the touch input.

5. The touch sensor of claim 4, wherein the filler material comprises a visible light transmissive material.

6. The touch sensor of claim 4, wherein the filler material comprises an elastomer.

7. The touch sensor of claim 4, wherein the filler material comprises a silicone.

8. The touch sensor of claim 4, wherein the filler material comprises a clear silicone.

9. The touch sensor of claim 4, wherein the conductive microstructures are disposed on a flexible substrate.

10. The touch sensor of claim 4, wherein the conductive layer is disposed on a flexible substrate.

11. The touch sensor of claim 4, wherein the conductive microstructures act as an electrical sink when local electrical contact is made between the conductive layer and at least a portion of the conductive microstructures.

12. The touch sensor of claim 4, wherein the conductive layer comprises a transparent conductive oxide.

13. The touch sensor of claim 4, wherein the conductive layer comprises a conductive polymer.

14. The touch sensor of claim 4, wherein the conductive microstructures comprise a transparent conductive oxide.

15. The touch sensor of claim 4, wherein the conductive microstructures comprises a conductive polymer.

16. The touch sensor of claim 4, wherein the conductive microstructures comprise a conformal conductive coating disposed over a plurality of protrusions.

17. The touch sensor of claim 4, wherein the conductive microstructures comprise ridges.

18. The touch sensor of claim 4, wherein the conductive microstructures comprise posts.

19. The touch sensor of claim 4, wherein the filler material further comprises particles dispersed therein.

20. The touch sensor of claim 19, wherein the particles comprise conductive particles.

21. The touch sensor of claim 4, wherein the conductive microstructures comprise a patterned conductive layer.

22. The touch sensor of claim 21, wherein the microstructures comprise parallel ridges, and the patterned conductive layer comprises stripes of conductive material residing on the parallel ridges.

23. The touch sensor of claim 4, wherein the conductive layer is patterned.

24. The touch sensor of claim 4, wherein the microstructures comprise a first plurality of protrusions that rise to substantially the same first height and a second plurality of protrusions that rise to substantially the same second height different from the first height.

25. A touch sensor comprising:
   a first substrate comprising a first conductive layer;
   a second substrate comprising a second conductive layer conformally covering a plurality of microstructures; and
   a solid, deformable filler material disposed between the first and second conductive layers,
   wherein at least one of the first and second substrates is flexible to allow electrical contact between the first conductive layer and the second conductive layer upon application of a force from a touch input so that the touch input location can be determined.

26. The touch sensor of claim 25, wherein the deformable material comprises an elastomeric material.

27. The touch sensor of claim 25, wherein the deformable material is disposed so that substantially no air gaps exist between the first and second conductive layers.

28. The touch sensor of claim 25, wherein the plurality of microstructures comprise bumps.

29. The touch sensor of claim 25, wherein the plurality of microstructures comprise posts.

30. The touch sensor of claim 25, wherein the plurality of microstructures comprise ribs.

31. The touch sensor of claim 25, wherein the first substrate is flexible.

32. The touch sensor of claim 25, wherein the second substrate is flexible.

33. The touch sensor of claim 25, wherein the first conductive layer comprises a transparent conductive oxide.

34. The touch sensor of claim 25, wherein the first conductive layer comprises a conductive polymer.

35. The touch sensor of claim 25, wherein the second conductive layer comprises a transparent conductive oxide.

36. The touch sensor of claim 25, wherein the second conductive layer comprises a conductive polymer.

37. The touch sensor of claim 25, wherein the first conductive layer is patterned.

38. The touch sensor of claim 25, wherein the second conductive layer is patterned.

39. The touch sensor of claim 25, wherein the microstructures comprise a first plurality of protrusions that rise to substantially the same first height and a second plurality of protrusions that rise to substantially the same second height different from the first height.

40. A method of determining the location of a touch on a touch screen comprising:

contacting a first electrode layer and a second electrode layer in response to the touch, the first electrode layer comprising a plurality of microstructures, a portion of the microstructures penetrating through a solid, deformable filler material during the contacting step; and measuring a signal due to contacting the first electrode layer and second electrode layer.

* * * * *